(12) United States Patent
Ceesay

(10) Patent No.: US 12,305,617 B2
(45) Date of Patent: May 20, 2025

(54) INCREASING ANY VERTICAL AXIS WIND TURBINES EFFICIENCY

(71) Applicant: Kaab Ceesay, Bronx, NY (US)

(72) Inventor: Kaab Ceesay, Bronx, NY (US)

(73) Assignee: Kaab Ceesay, Bronx, NY (US)

( * ) Notice: Subject to any disclaimer, the term of this patent is extended or adjusted under 35 U.S.C. 154(b) by 99 days.

(21) Appl. No.: 18/243,371

(22) Filed: Sep. 7, 2023

(65) Prior Publication Data

US 2025/0084826 A1 Mar. 13, 2025

(51) Int. Cl.
*F03D 3/04* (2006.01)
*F03D 3/00* (2006.01)

(52) U.S. Cl.
CPC ........... *F03D 3/0472* (2013.01); *F03D 3/005* (2013.01); *F05B 2240/13* (2013.01); *F05B 2240/211* (2013.01)

(58) Field of Classification Search
CPC .......... F03D 3/005; F03D 3/007; F03D 3/009; F03D 3/0436; F03D 3/0472; F03D 3/066; F03D 1/042; F05B 2240/13; F05B 2240/211; F05B 2240/213
USPC ........................................................ 415/4.4
See application file for complete search history.

(56) References Cited

U.S. PATENT DOCUMENTS

| | | | | |
|---|---|---|---|---|
| 1,808,874 A | * | 6/1931 | Wilson | F03D 3/0472 |
| | | | | 415/4.4 |
| 4,288,200 A | * | 9/1981 | O'Hare | F03D 3/0481 |
| | | | | 415/4.4 |
| 11,746,745 B2 | * | 9/2023 | Patel | F03D 3/0463 |
| | | | | 415/42 |

FOREIGN PATENT DOCUMENTS

| | | | | |
|---|---|---|---|---|
| CN | 201615029 U | * | 10/2010 | |
| CN | 112983734 A | * | 6/2021 | |
| JP | 2008025518 A | * | 2/2008 | ........... F03D 3/0472 |

* cited by examiner

*Primary Examiner* — Woody A Lee, Jr.
*Assistant Examiner* — Justin A Pruitt

(57) ABSTRACT

An effective method to increase the efficiency of any vertical axis wind turbines attached to any stationary objects to generate electricity, Is to attach a reactive-shield system to the turbine. The reactive-shield system is any shield system that can change and align itself with the direction of the wind in real time. The system needs to be stable enough to always make the shield stay in front of the turbine once it is aligned with the wind. The shield shields most of the turbine front from the wind except the blade open facing the wind direction allowing it to experience the full force of the wind which increases the turbine efficiency, while shielding the blade spinning against the wind to experience no wind which reduces drag.

4 Claims, 8 Drawing Sheets

INCREASING ANY VERTICAL AXIS WIND TURBINES EFFICIENCY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEACH AGREEMENT

Not Applicable

Figure 1:
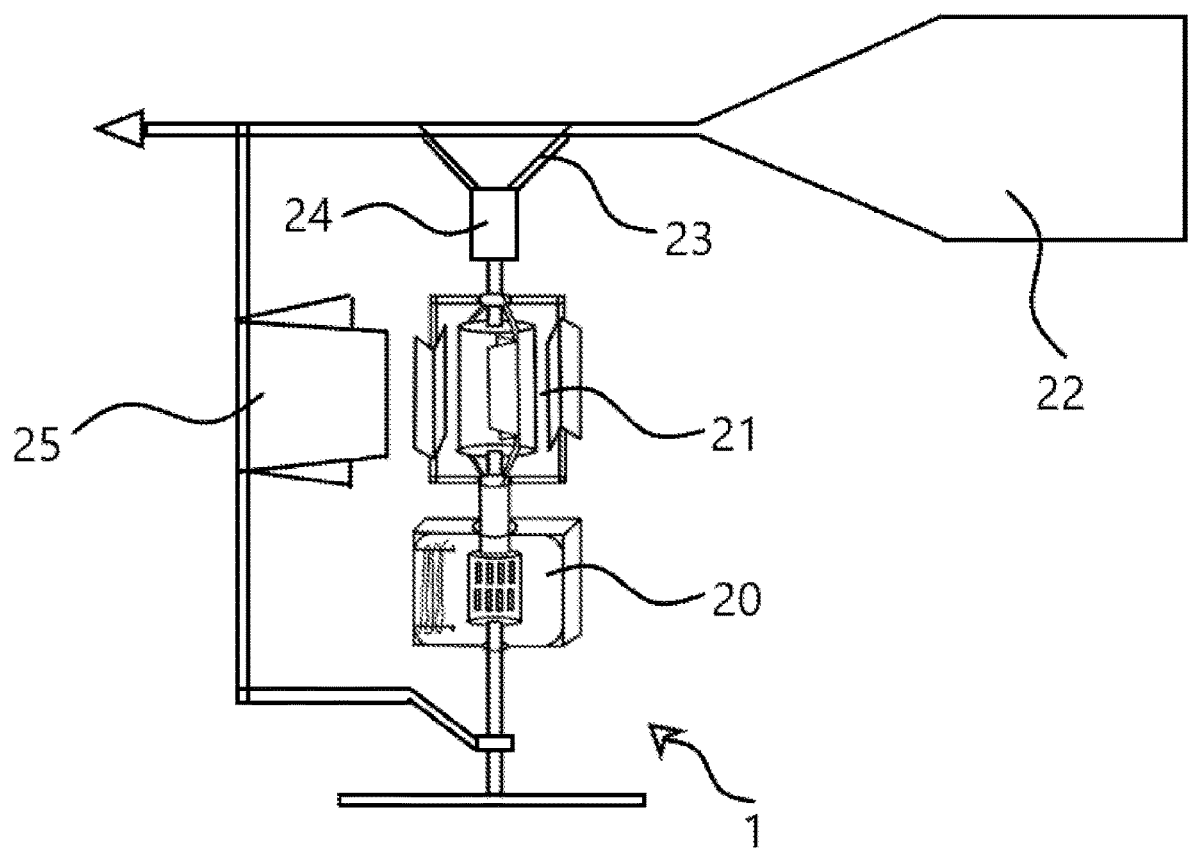

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

DESCRIPTION

TECHNICAL FIELD OF THE INVENTION

This innovation is related to a vertical axis wind turbine, specifically the method which will increase the turbine efficiency. This method will increase the efficiency of any vertical axis wind turbine which is attached to any stationary objects or structures to generate electricity to charge batteries or supply power directly to infrastructure like Buildings, Offices, Malls, Manufacturing Plants, House's etc. Which I discovered while I was testing out my earlier invention, A effective method to attach vertical axis wind turbines to EVs and charge it while driving, application Ser. No. 18/209,772, to see which method will be the most effective and efficient way to attach vertical axis wind turbines to Electric Vehicles to charge it while driving. I discovered that putting a shield in front of the turbine, that will shield most of the turbine front except the blade open facing the wind, will increase the turbine efficiency. That was for when the turbine is attached to moving objects, the shield is fixed in place. This innovation is for stationary objects or structures where the shield is free to rotate with the wind. This time I discovered a way to attach the shield to any vertical axis wind turbine that is also attached to any stationary objects or structures by allowing the shield to rotate with the wind, in a way that the shield always stays in front of the turbine as the wind changes direction, either by mechanical, computerized, motorized methods, transducer or combination of one or more. Also the shield rotation is independent of the turbine blades rotation. I found that allowing the shield to rotate with the changes in wind in real time by any methods to keep shielding most of the turbine front will increase the turbine and effectiveness throughout the day. I also found that connecting the shield to a stabilizer that acts and behaves like a wind vane will work and increase the efficiency and reduce drag of the turbine when attached to stationary objects or structures also. The stabilizer always points to the direction of the wind like a wind vane. It will move until it is aligned with the wind, then it stays in place until the wind changes direction again. Then it repeats the same process again. Connecting the shield to the stabilizer will cause the shield to stay in front of the wind turbine between the turbine and the wind, shielding most of the front of the vertical axis wind turbine except the blade which is open facing the wind and only allowing the wind to interact with this blade at all times. Therefore making a reactive-shield system, because when the stabilizer rotates it will rotate the shield into the right position for the maximum operation efficiency of the turbine at all the times, which is the front of the turbine, between the wind and the turbine, It doesn't matter which direction the wind is blowing. The shield is what increases the turbine efficiency. The reaction-shield system is what makes the shield effective throughout the day with changes in wind direction. The shield can be connected, operated and controlled in many different forms. This method is most efficient because the shield will also force some wind into the blade open facing the wind. The wind pushes against the blades open facing the wind causing the turbine to spin efficiently. However, due to the shield shielding most of the front of the turbine, the blades not facing the wind will not experience any wind pushing against it, reducing the blade drag which also increases efficiency. Also the turbine design used in the drawings is from my earlier patent. Patent No: U.S. Pat. No. 11,614,073 B1

BACKGROUND OF THE INVENTION

A vertical axis wind turbine power generating system has been around for many decades now and many designs, each calming supremacy. However many engineers and researchers are still trying to find a way to increase the efficiency of vertical axis wind turbines. This method provides a solution to the problem, as global demand for wind energy has increased. As well as many investors and companies are still trying to find the right method or way to invest in. This reactive-shield method focuses on efficiency by further reducing the drag of the blade not facing the direction of the wind. The reactive-shield method will also allow for this increase in efficiency and effectiveness of the turbine. By making it easy for the blades not facing the front or direction of the wind to not experience large wind pushing against the blade, while it rotates. The wind is the source of the drag. The reactive-shield system reduces the amount and the speed of wind in contact with the blades not facing the wind direction. While the blade open facing the direction of the wind is allowed to have maximum contact and exposure to wind pushing against it. This combined process will increase the turbine angular rotation speed as well as require less wind to spin the turbine. Since the opposite blade is not experiencing any drag. This method will generate a usable amount of energy to charge batteries and supply power to infrastructures. Making people's lives easy.

Existing art: A vertical axis wind turbine attached to a stationary objects or structures is coupled with many different parts. Such as the wind turbine, blades, Joints, bearings, rods, pins, motor, shield, stabilizer, welded parts, coil windings, nuts, bolts and how the wind turbine is connected to the stationary objects or structures will use the same techniques that have been around for many hundreds of years. My method is different because of the way it puts different parts together like the wind turbine, the shield, the stabilizer and the motor together to bring about better efficiency and effective use of vertical axis wind turbines attached to stationary objects or structures because the reactive-shield changes with the direction of the wind. Connecting a reactive-shield to a vertical axis wind turbine when attaching it stationary objects or structures method is relatively new. I am not aware of any design that uses this technique to the best of my knowledge.

Current Art: List of the Disadvantages of the Current Art

1) In ability to generate enough power due to low efficiency
2) Expensive to build and operate
3) Expensive to research
4) Too much drag experience by the returning blades
5) Not reliable
6) Mounting methods are not able to capture the maximum amount of wind and utilized
7) Mounting methods are not designed to increase efficiency and reduce drag.
8) Most researches and researchers focused on horizontal axis wind turbines.

BRIEF SUMMARY OF THE INVENTION

The purpose of this reactive-shield method is to increase the efficiency of vertical axis wind turbines, bring the turbines closer to the users, make the turbines available and useful to many people and areas since they are smaller than horizontal axis wind turbines, also making the turbines Climate friendly. This method is suitable for small to medium vertical axis wind turbines. So the turbine will be efficient and effective without taking too much space all while still being efficient. The method is able to achieve this claim because of the unique positioning and movement of the reactive-shield system, which is positioned In front and slightly to one side of the vertical axis wind turbine between the wind turbine and the wind. Only allowing the blades open facing the wind to experience the full effect of the wind. This is good because there will be no wind pushing against the opposite blades, causing the turbine to spin faster. The blade that is facing away from the direction of the wind drag is reduced, because the blade is shield from the wind, allowing the blades to experience little to no wind. The purpose of the shield is to keep the blade not facing the wind from experiencing the full effect of the wind to reduce drag and increase efficiency. The purpose of the stabilizer is to move and keep the shield placed once it is aligned with the wind, because the stabilizer always points to the direction of wind. The bottom half is the turbine is not shield from the wind because it does not contribute to efficiency and effectiveness of the method in generating electricity. The uniqueness of the method is the addition of the reactive-shield system which makes the turbine efficient in generating electricity.

BRIEF DESCRIPTION OF THE SEVERAL VIEWS OF THE DRAWING(S)

Note: For simplicity of the illustration turbine details, nuts, bolts, welded areas, glued and attached area's are not depicted as they are known to those who are skilled in this art. When they are shown is purely for illustration purposes, and not intended to capture all embodiments of the invention disclosed.

FIG. 1. Is a complete side view of the entire system. It shows the generator, the blade section, the shield in front of the blades, the connecting points, the stabilizer like a tail behind the entire system and the arrow of the stabilizer pointing to the direction of the wind.

Figure 2:
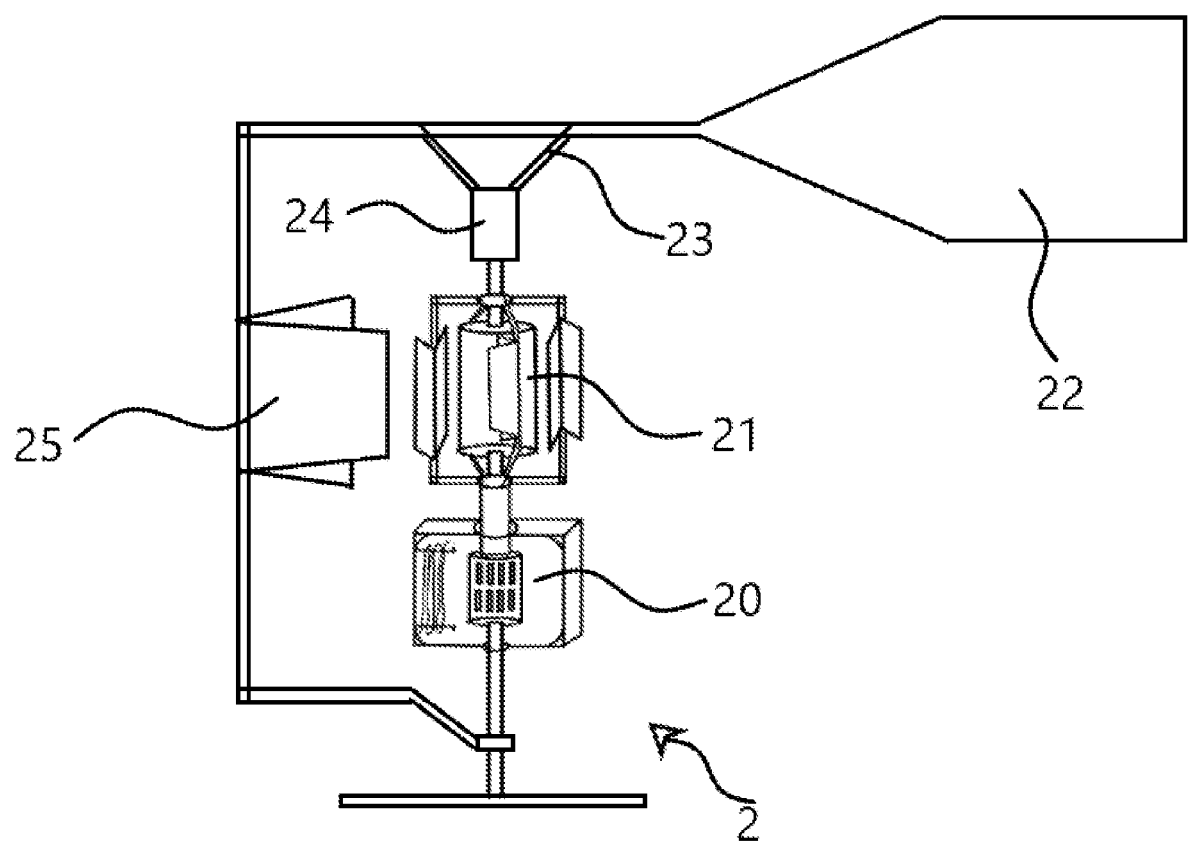

FIG. 2. Is a complete side view of the entire system. It shows the generator, the blade section, the shield in front of the blades, the connecting points, the stabilizer like a tail behind the entire system without the arrow, the arrow is not really needed.

Figure 3:
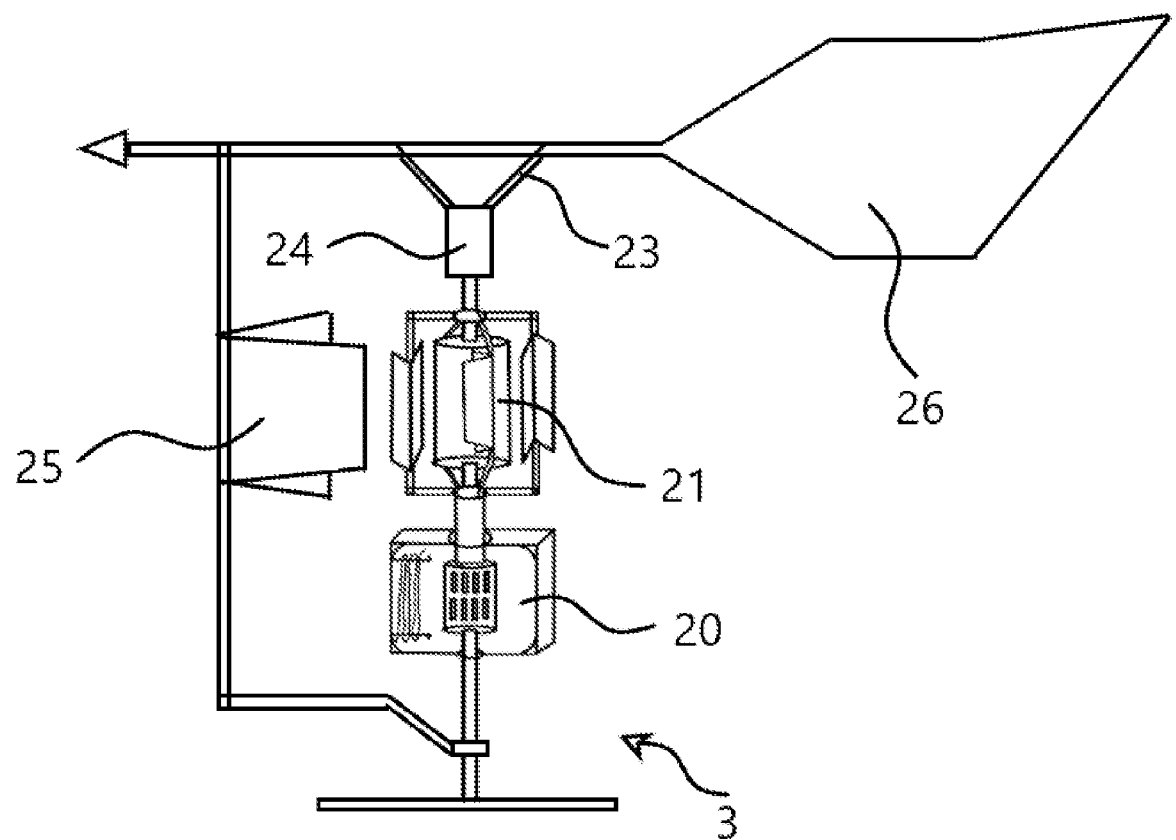

FIG. 3. Is a complete side view of the entire system. It shows the generator, the blade section, the shield in front of the blades, the connecting points, a different shape stabilizer like a tail behind the entire system and the arrow of the stabilizer pointing to the direction of the wind.

Figure 4:
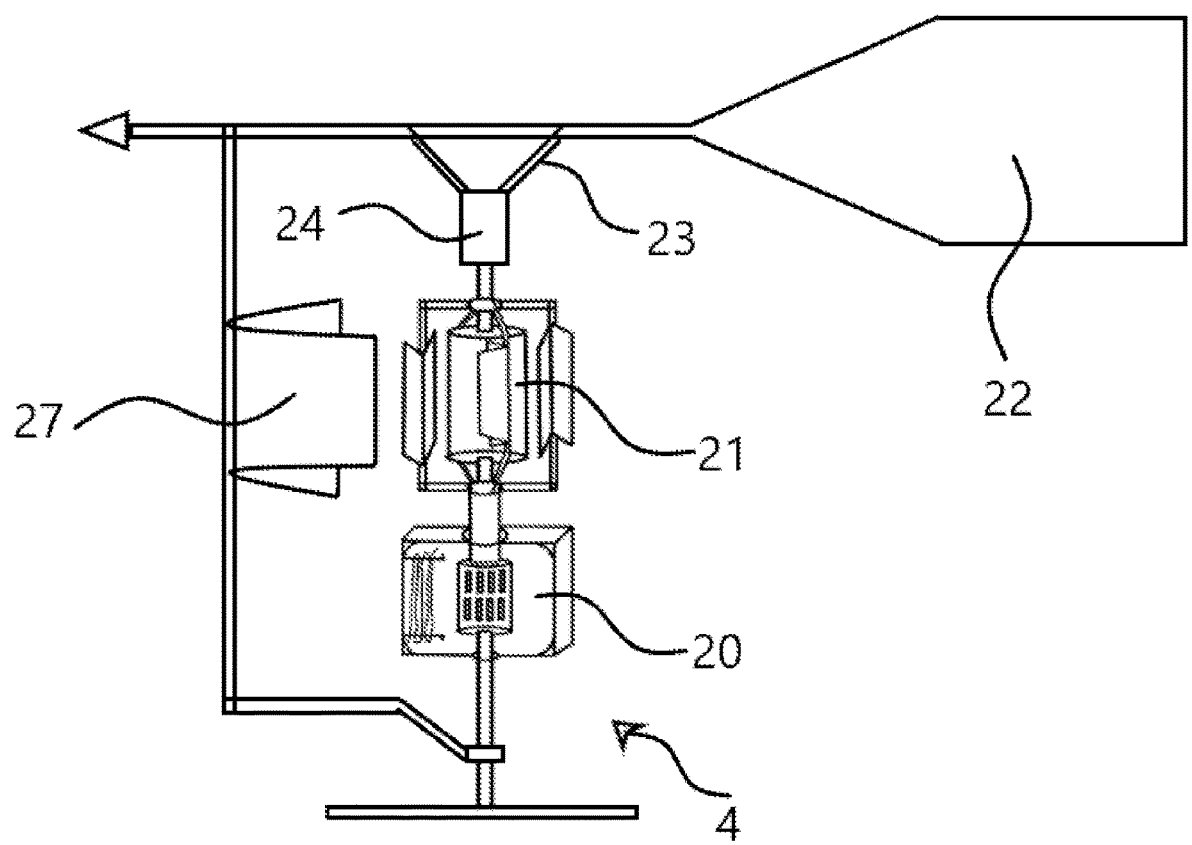

FIG. 4. Is a complete side view of the entire system. It shows the generator, the blade section, a different shape shield in front of the blades, the connecting points, the stabilizer like a tail behind the entire system and the arrow of the stabilizer pointing to the direction of the wind.

Figure 5:
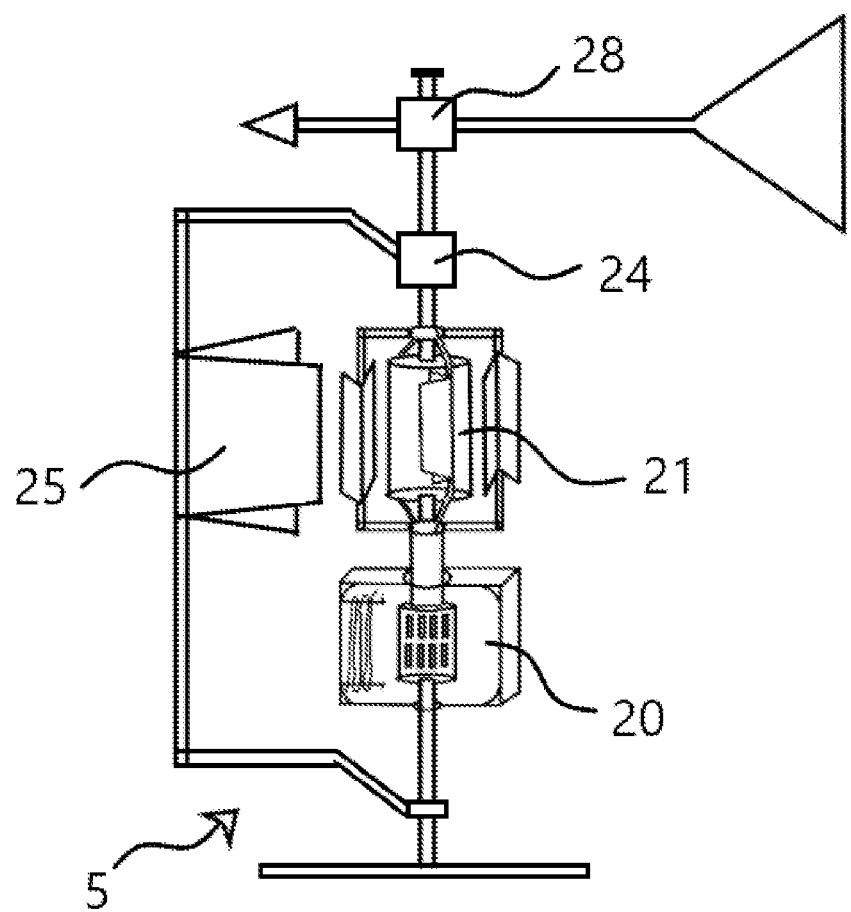

FIG. 5. Is a complete side view of the entire system. It shows the generator, the blade section, it shows the shield in front of the blades, it shows two different connecting points one for the shield and one for the wind vane, it shows a wind vane on top of the system that indicates wind direction and the data from it will be used to adjust the shield.

Figure 6:
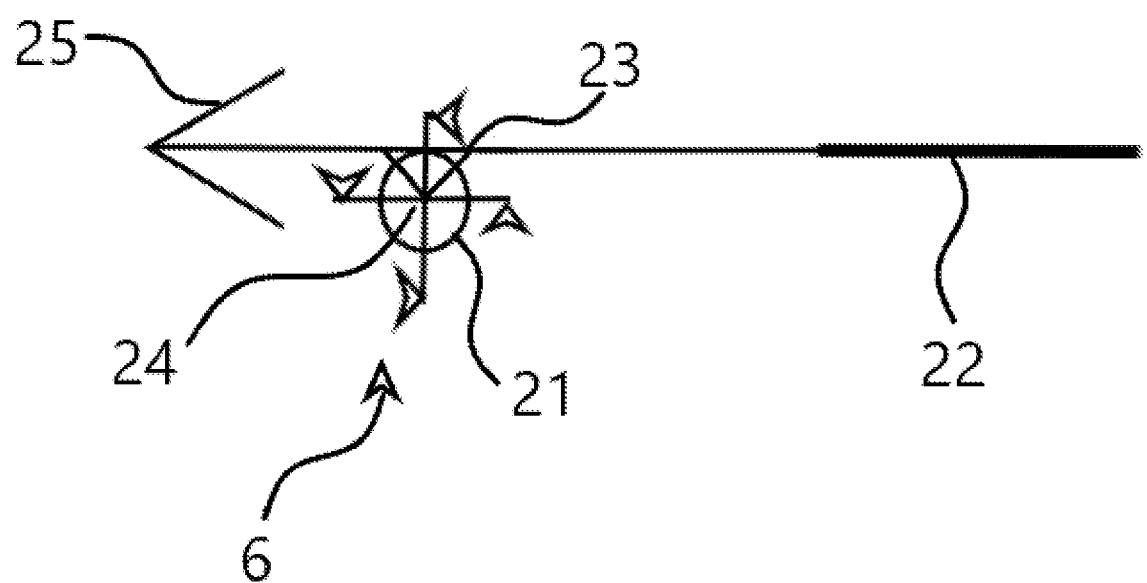

FIG. 6. The figure shows a close in top view of the entire system in FIG. 2. It shows the shield in front as a side facing open triangle, the blade section in the middle as a circle with open triangles on it sides connected to rods meeting at the center of the circle, a up facing triangle connecting the shield and the stabilizer (reactive-shield system) to the turbine as the connecting points, emphasizing how the shield is slightly off center, it shows accurate size ratio between the turbine and the connecting point, and it also shows the stabilizer behind the turbine and the entire system.

Figure 7:
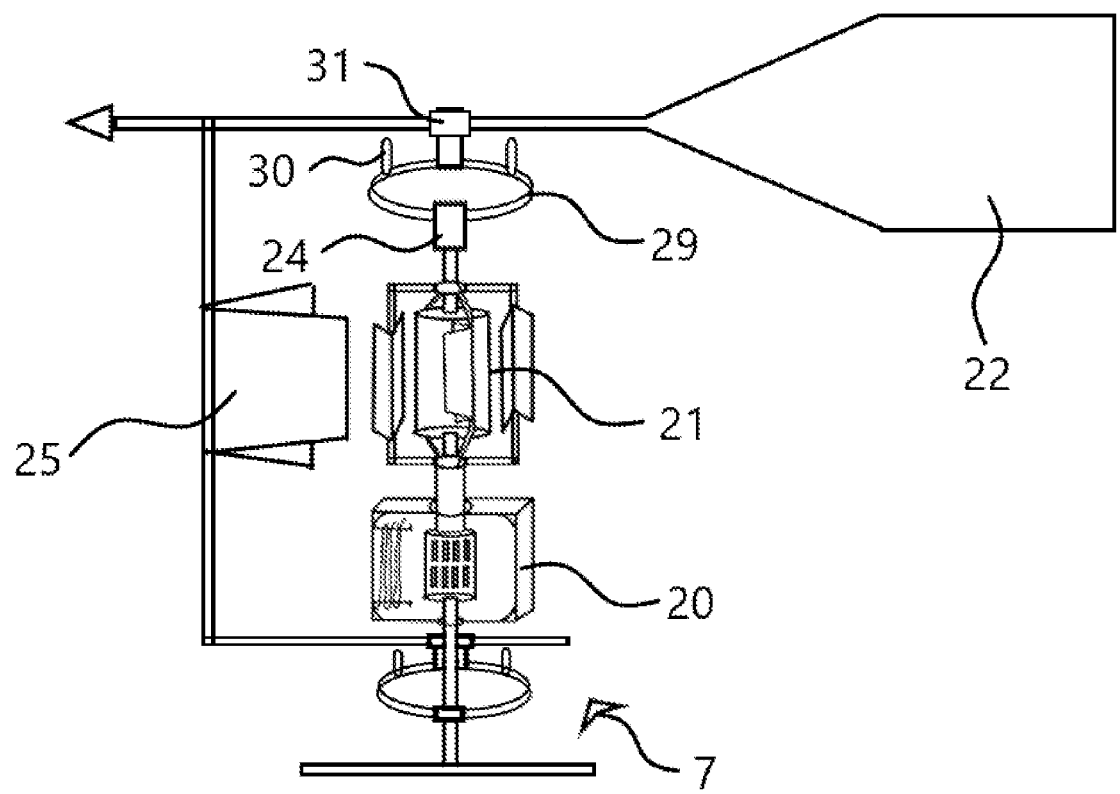

FIG. 7. Is a complete side view of the entire system. It shows the generator, the blade section, the shield in front of the blades, it shows different connecting points, the stabilizer like a tail behind the entire system and the arrow of the stabilizer pointing to the direction of the wind.

Figure 8:
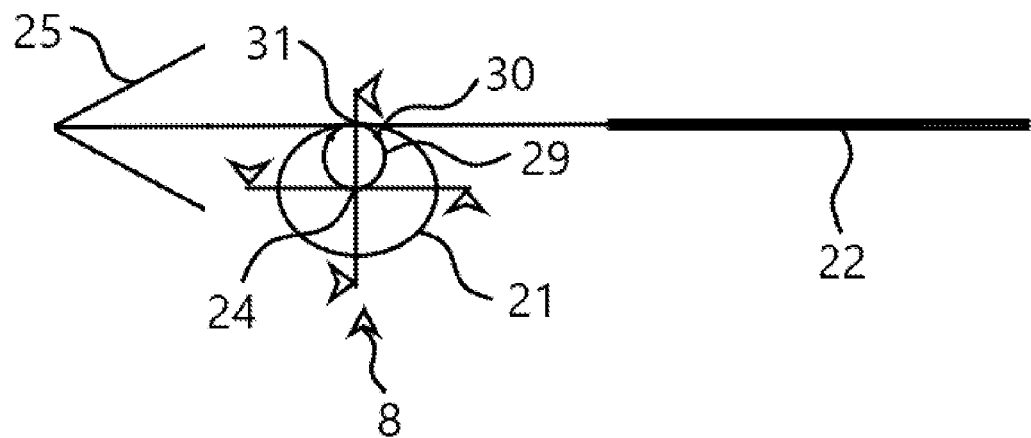

FIG. 8. The figure shows a close in top view of the entire system in FIG. 7. It shows the shield in front as a side facing open triangle, the blade section in the middle as a circle with open triangles on it sides connected to rods meeting at the center of the circle, a small circle connecting the shield and the stabilizer (reactive-shield system) to the turbine as the connecting points, emphasizing how the shield is slightly off center, it shows accurate size ratio between the turbine and the connecting point, and it also shows the stabilizer behind the turbine and the entire system.

Figure 9:
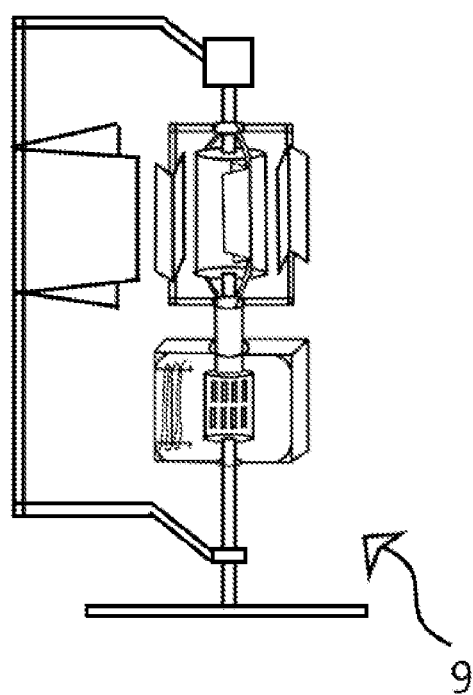

FIG. 9. It is just the side view of the turbine and the shield only, where the turbine system could get data from external sources to adjust the shield.

DETAILED DESCRIPTION OF THE INVENTION

The various embodiment variations therefore illustrated in the accompanying Figures and/or described herein merely exemplary and are not meant to limit the scope of the invention. It is to be appreciated that numerous variations of the invention have been contemplated as would be obvious to one of ordinary skills in the art with the benefits of this disclosure. Rather, the scope and breadth of afforded this document should only be limited by the claim provided herein while applying either the plain meaning of each the terms and phrases in the claim or the meaning clearly and unambiguously provided in this specification.

Terminology

The terms and phrases as indicated in parenthesis (" ") in this section are intended to have the meaning ascribed to them in this section applied to them throughout this document including the claims unless clearly indicated otherwise in context.

The term "or" as used in the specifications and the appended claims is not meant to be exclusive, rather the term is inclusive meaning "either or both".

Reference in the specification to "one embodiment", "an embodiment", "a preferred embodiment", "an alternative embodiment", "embodiments", "variations", and similar phrases mean that a particular feature, structure, and characteristic described in connection with the embodiment(s) or variation(s) is included in at least an embodiment or variation of the invention. The appearance of the phrase "in one embodiment" or "in one variation" in various places in the specification are not necessarily all referring to the same embodiment or variation.

The term "meeting", "rotate", "connected", "joined", "welded", "vertical", "attached", or "mounted" as used in the specification and the appended claims referred to either an indirect or direct connection between the identified elements, components or objects. Often the manner of the coupling will be related specifically to the manner in which the two coupled elements interact.

The phrases "reactive-shield", "connecting points", "vertical axis", "slightly off center", "in front of the turbine" and "behind the turbine" and similar phrases refer to reactive-shield operating and the turbine operating methods respectively wherein the turbine is in an upright standing position. The "upright standing position" is the most common and well known way a typical vertical axis wind turbine operates at. This type of turbine and accordingly the phrases as used herein does not deviate from that commonly held meaning. In contrast, a "blade open facing the wind", "blade not open facing the wind", is one in which the blades open facing the shield or the wind is the blade open facing the wind, while the blades not open facing the shield or the wind is the blade not open facing the wind or the blade which shield from the wind. The "shield in front and slightly off center" is when most of the front of the turbine is shield (covered) from the wind except the blade open facing the wind.

There are hundreds of components associated with the shield, stabilizer and the vertical axis wind turbine that are so commonly known as to be turbine parts therefore are excluded from the description herein. Items such as blade details, shield detail, stabilizer detail, welded details, bearing details, nuts, bolts, washers and the like. Those individuals with ordinary skills in the art, with the benefit of this disclosure can, from the descriptions and diagrams provided herein easily and obviously understand and determine exactly what is required to manufacture, assembly or buy items not shown.

An Embodiment of a Vertical Axis Wind Turbine With Reactive-Shield System for Increasing Efficiency Design An embodiment of a proper method to increase the efficiency of any vertical axis wind turbine when attached to any stationary objects or structures illustrated all or in part in FIGS. 1-9. Referring primarily to FIG. 1), line 20 is just the side view of the generator, line 21 is just the blade section of the wind turbine, line 22 is just the stabilizer shown as a tail behind the turbine and the entire system, line 23 is the side view of the connecting points showing how the reactive-shield system is slightly off center to the turbine, line 24 is where the reactive-shield system connect to a bearing or motorized methods at top of the turbine, line 25 is the shield which is in front of the turbine shielding most of the turbine from the wind except the blade facing the wind.

Referring primarily In FIG. 2), line 20 is just the side view of the generator, line 21 is just the blade section of the wind turbine, line 22 is just the stabilizer shown as a tail behind the turbine and the entire system, line 23 is the side view of the connecting points showing how the reactive-shield system is slightly off center to the turbine, line 24 is where the reactive-shield system connect to a bearing or motorized methods at top of the turbine, line 25 is the shield which is in front of the turbine shielding most of the turbine from the wind except the blade facing the wind.

Referring primarily in FIG. 3), line 20 is just the side view of the generator, line 21 is just the blade section of the wind turbine, line 23 is the side view of the connecting points showing how the reactive-shield system is slightly off center to the turbine, line 24 is where the reactive-shield system connect to a bearing or motorized methods at top of the turbine, line 25 is the shield which is in front of the turbine shielding most of the turbine from the wind except the blade facing the wind, line 26 is just a different stabilizer shown as a tail behind the turbine and the entire system to show that the system is compatible with many different types, forms, sizes and shapes of stabilizers. Referring primarily in FIG. 4), line 20 is just the side view of the generator, line 21 is just the blade section of the wind turbine, line 22 is just the stabilizer shown as a tail behind the turbine and the entire system, line 23 is the side view of the connecting points showing how the reactive-shield system is slightly off center to the turbine, line 24 is where the reactive-shield system connect to a bearing or motorized methods at top of the turbine, line 27 is a different shield in front of the turbine shielding most of the turbine from the wind except the blade facing the wind, to show that the system is compatible with many different types, forms and shapes of shields.

Referring primarily In FIG. 5), line 20 is just the side view of the generator, line 21 is just the blade section of the wind turbine, line 24 is where the reactive-shield system connect to a bearing, motorized or transducer methods at top of the turbine, line 25 is the shield which is in front of the turbine shielding most of the turbine from the wind except the blade facing the wind, line 28 it shows a wind vane on top of the system that indicates wind direction and the data from it will be used to adjust the shield.

Referring Primarily In FIG. 6), line 21 is just the top view of the blade section of the wind turbines as circle with open triangles on it sides connected to rods meeting at the center of the circle, line 22 is just the top view of the stabilizer shown as a bold line behind the turbine and the entire system, line 23 is the top view of the connecting points as a up facing triangle connecting the shield and the stabilizer (reactive-shield system) to the turbine at the center of the circle, to emphasizing how the shield is slightly off center and how the connecting points can be configured in many different ways, this is one of the simple ways, line 24 is the top view of where the reactive-shield system connect to a bearing or motorized methods at top of the turbine (center of the circle), line 25 is the top view of the shield which is in front of the turbine as a side facing open triangle, shielding most of the turbine from the wind except the blade facing the wind.

Referring primarily to FIG. 7), line 20 is just the side view of the generator, line 21 is just the blade section of the wind turbine, line 22 is just the stabilizer shown as a tail behind the turbine and the entire system, line 24 is where the reactive-shield system connect to a bearing or motorized methods at top of the turbine, line 25 is the shield which is in front of the turbine shielding most of the turbine from the wind except the blade facing the wind. line 29 is the side view of a different connecting points showing how the reactive-shield system is slightly off center to the turbine, line 30 is a stop rod sticking up out off the connecting point which allows the reactive shield system to rotate around the turbine only after a change in the wind direction is large enough, line 31 is a another bearing that allows the reactive shield system to be even more independent and stable of the turbine, Referring Primarily In FIG. 8), line 21 is just the top view of the blade section of the wind turbines as circle with open triangles on it sides connected to rods meeting at the center of the circle, line 22 is just the top view of the stabilizer shown as a bold line behind the turbine and the entire system, line 24 is the top view of where the reactive-shield system connect to a bearing or motorized methods at top of the turbine (center of the circle), line 25 is the top view of the shield which is in front of the turbine as a side facing open triangle, shielding most of the turbine from the wind except the blade facing the wind, line 29 is the top view of the connecting points as a small circle connecting the shield and the stabilizer (reactive-shield system) to the turbine at the center of the circle, to emphasizing how the shield is slightly off center and how the connecting points can be configured in many different ways, this is another simple ways, line 30 is a top view of a stop rod sticking up out off the connecting point which allows the reactive shield system to rotate around the turbine only after a change in the wind direction is large enough, line 31 is a another bearing that allows the reactive shield system to be even more independent and stable of the turbine.

The invention claim is:

1. A vertical axis wind turbine with a shield comprising:
   a. a center pole with a bearing at a top of a center pole and a supporting base at a bottom which the center pole stands on, the center pole and the supporting base does not rotate,
   b. on the top of the center pole is a blade section and on a bottom of the pole is a generator section of the wind turbine,
   c. in front of the wind turbine blade section, a shield which is approximately symmetric on a horizontal axis, which when viewing the wind turbine system from the top, is placed, wherein the shield height is equal to or more than a blades height, in a way that the shield covers ¾ of the front of the wind turbine blade section from the wind except a blade open facing the wind,
   d. the horizontal axis is horizontally spaced from the center pole, the horizontal axis comprising a horizontal pole that connects the shield with the center pole,
   e. a distance between the horizontal pole and the center pole is equal to ¼ of a diameter of the blade section of the wind turbine or ½ of a distance between the center of a blade of the blade section and the center of the center pole,
   f. the shield is coupled to vertical poles and horizontal poles at a top of the shield, the horizontal pole is indirectly coupled to the bearing via another rod to make up for the offset distance between the center pole and the horizontal pole,
   g. the shield is also coupled to bottom vertical and bottom horizontal poles at a bottom of the shield, a bottom horizontal pole of the bottom horizontal poles is also indirectly coupled to a bottom bearing on the center pole which is below the generator section via another rod to make up for a bottom offset distance between the bottom horizontal pole and the center pole.

2. The vertical axis wind turbine as claimed in claim 1, wherein the horizontal pole of the shield is directly coupled to a stabilizer which behaves like a wind vane, such that when a wind direction changes the stabilizer is configured to align the shield with the a new wind direction, the horizontal pole directly connects the shield with the stabilizer, the stabilizer is above and behind the blade section of the wind turbine.

3. The vertical axis wind turbine as claimed in claim 1, further comprising a group control, the group control comprising a motor, a control box and a wind vane that collects data on a direction of the wind, the control box receives data from the wind vane, mounted on the wind turbine, and uses the data to send a signal to the motor to rotate the shield such that the shield is aligned with the direction of the wind.

4. The vertical axis wind turbine as claimed in claim 1, further comprising a group control, the group control comprising a motor and a control box, the control box is configured to receive data from a local weather station and use the data to send a signal to the motor to rotate the shield such that the shield is aligned with a direction of the wind.

* * * * *